(12) United States Patent
Engström

(10) Patent No.: US 11,044,223 B2
(45) Date of Patent: Jun. 22, 2021

(54) CONNECTION ESTABLISHMENT FOR NODE CONNECTED TO MULTIPLE IP NETWORKS

(71) Applicant: Telefonaktiebolaget LM Ericsson (publ), Stockholm (SE)

(72) Inventor: Stefan Engström, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 83 days.

(21) Appl. No.: 16/327,591

(22) PCT Filed: Aug. 25, 2016

(86) PCT No.: PCT/EP2016/070114
§ 371 (c)(1),
(2) Date: Feb. 22, 2019

(87) PCT Pub. No.: WO2018/036632
PCT Pub. Date: Mar. 1, 2018

(65) Prior Publication Data
US 2019/0190882 A1    Jun. 20, 2019

(51) Int. Cl.
*G06F 15/16* (2006.01)
*H04L 29/12* (2006.01)
(Continued)

(52) U.S. Cl.
CPC ............ *H04L 61/103* (2013.01); *H04L 69/14* (2013.01); *H04W 76/12* (2018.02); *H04L 12/4641* (2013.01); *H04W 92/20* (2013.01)

(58) Field of Classification Search
CPC ... H04L 61/103; H04L 69/14; H04L 12/4641; H04W 76/12; H04W 92/20
(Continued)

(56) References Cited

U.S. PATENT DOCUMENTS

| 2004/0017798 A1* | 1/2004 | Hurtta | H04L 67/14 370/352 |
| 2007/0171879 A1* | 7/2007 | Bourque | H04W 76/11 370/338 |

(Continued)

FOREIGN PATENT DOCUMENTS

WO    2009/120127 A1    10/2009

OTHER PUBLICATIONS

International Search Report and Written Opinion dated Apr. 11, 2017 issued in International Application No. PCT/EP2016/070114. (10 pages).

(Continued)

*Primary Examiner* — Johnny B Aguiar
(74) *Attorney, Agent, or Firm* — Patent Portfolio Builders, PLLC

(57) ABSTRACT

A node (321, 322, 323) of a communication network configures multiple IP addresses of the node (321, 322, 323). Each of the multiple IP addresses are associated with a corresponding IP network (311, 312, 313) to which the node (321, 322, 323) is connected. Each of the these IP networks (321, 322, 323) is identified by a corresponding network identifier. In response to a request sent by the node (321, 322, 323), the node receives connection information of a further node (321, 322, 323) of the communication network. The received connection information includes at least one network identifier and an associated IP address of the further node (321, 322, 323). Based on the at least one network identifier, the node (321, 322, 323) selects one of the IP networks (311, 312, 313). Via the selected IP network (311, 312, 313) and based on the associated IP address, the node (321, 322, 323) establishes an IP based connection to the further node (321, 322, 323).

18 Claims, 6 Drawing Sheets

(51) Int. Cl.
 *H04W 76/12* (2018.01)
 *H04L 29/06* (2006.01)
 *H04W 92/20* (2009.01)
 *H04L 12/46* (2006.01)

(58) Field of Classification Search
 USPC .................................. 709/227, 238, 245
 See application file for complete search history.

(56) References Cited

U.S. PATENT DOCUMENTS

| | | | | |
|---|---|---|---|---|
| 2011/0243097 | A1* | 10/2011 | Lindqvist | H04W 24/02 370/331 |
| 2012/0094675 | A1* | 4/2012 | Godin | H04W 36/0055 455/438 |
| 2014/0226467 | A1 | 8/2014 | Park | |
| 2014/0269364 | A1* | 9/2014 | Knapp | H04L 41/0823 370/252 |
| 2015/0124702 | A1* | 5/2015 | Ozturk | H04W 24/00 370/328 |
| 2016/0088519 | A1 | 3/2016 | Hoffmann | |
| 2017/0303189 | A1* | 10/2017 | Hampel | H04W 8/082 |

OTHER PUBLICATIONS

3GPP TS 36.413 V13.1.0 (Dec. 2015) Technical Specification; 3rd Generation Partnership Project; Technical Specification Group Radio Access Network; Evolved Universal Terrestrial Radio Access Network (E-UTRAN); S1 Application Protocol (S1AP) (Release 13) (Dec. 2015). (314 pages).

Qualcomm Europe, "Discovery of neighbor eNB IP address"; 3GPP TSG-RAN WG3 #61, R3-081821, Aug. 18-22, 2008, Jeju Island, Korea. (6 pages).

"Network sharing"; beyond3g; Dec. 17, 2010; beyond3g.wordpress.com/2010/12/17/network-sharing/. (2 pages).

European Office Action issued in corresponding EP Application No. 16758145.3 dated Nov. 27, 2019, 05 Pages.

* cited by examiner

CONNECTION ESTABLISHMENT FOR NODE CONNECTED TO MULTIPLE IP NETWORKS

CROSS REFERENCE TO RELATED APPLICATION(S)

This application is a 35 U.S.C. § 371 National Stage of International Patent Application No. PCT/EP2016/070114, filed Aug. 25, 2016, designating the United States. The above identified applications are incorporated by reference.

TECHNICAL FIELD

The present invention relates to methods of controlling connection establishment in a communication network and to corresponding devices and systems.

BACKGROUND

In communication networks, it is known to use Internet Protocol (IP) based connections. In this case, two nodes of the communication network can connect to an IP network and establish an IP based connection via the IP network. In the IP network, each of the nodes has an IP address which can be used to address IP data packets to the node. One example of using IP based connections is within a wireless communication network, e.g., in a Radio Access Network (RAN) part of the wireless communication network. For example, in a wireless communication network based on the LTE (Long Term Evolution) technology as specified by 3GPP ($3^{rd}$ Generation Partnership Project), access nodes of the wireless communication network, referred to as eNB (evolved Node B), may be connected to each other by X2 interfaces. As for example described in 3GPP TS 36.420 V13.0.0 (2015-12), a transport network layer (TNL) of the X2 interface is based on IP connections.

For establishing a connection via the X2 interface, a first eNB may discover the IP address of a second eNB by requesting TNL information of the second eNB from a core network (CN) part of the wireless communication network, in particular from a node referred to as MME (Mobility Management Entity). Messages of a corresponding procedure are for example described in sections 8.15 and 8.16 of 3GPP TS 36.413 V13.3.0 (2016-06).

In some cases a RAN may also use multiple different IP networks for connecting its nodes. For example, in scenarios where the infrastructure of the RAN is shared by different operators, multiple different IP networks could be used for accommodating individual address planning of the operators or for facilitating separation of network traffic. When using multiple IP networks, each IP network may assign a different IP address to the same node. In this case, establishing a connection between two nodes becomes more complex, because each of the multiple IP networks could in principle be used for establishing the connection and the IP addresses of the first and second node may be different in each of the possible IP networks.

Accordingly, there is a need for techniques which allow for efficient connection establishment for nodes which are connected to multiple different IP networks.

SUMMARY

According to an embodiment of the invention, a method of controlling connection establishment in a communication network is provided. According to the method, a node of the communication network configures multiple IP addresses of the node. Each of the multiple IP addresses are associated with a corresponding IP network to which the node is connected. Each of the these IP networks is identified by a corresponding network identifier. In response to a request sent by the node, the node receives connection information of a further node of the communication network. The received connection information comprising at least one network identifier and an associated IP address of the further node. Based on the at least one network identifier, the node selects one of the IP networks. Via the selected IP network and based on the associated IP address, the node establishes an IP based connection to the further node.

According to a further embodiment of the invention, a method of controlling connection establishment in a communication network is provided. According to the method, a node of the communication network sends connection information of the node in response to a request received by the node. The sent connection information comprises at least one network identifier identifying an IP network to which the node is connected and an IP address of the node associated with this IP network. The sent connection information enables a further node of the communication network to establish an IP based connection to the node.

According to a further embodiment of the invention, a method of controlling connection establishment in a communication network is provided. According to the method, a node of the communication network receives a request from a first further node of the communication network. The first further node has multiple IP addresses, each of the multiple IP addresses is associated with a corresponding IP network to which the first further node is connected. Each of the these IP networks is identified by a corresponding network identifier. In response to the request, the node sends connection information to the first further node. The sent connection information comprises at least one network identifier identifying at least one of the IP networks to which the first further node is connected, and to which also the second further node is connected. Further, the sent connection information comprises an IP address of the second further node associated with the at least one IP network. The sent connection information enables the first further node to establish an IP based connection to the second further node.

According to a further embodiment of the invention, a node for a communication network is provided. The node is adapted to configure multiple IP addresses of the node. Each of the multiple IP addresses is associated with a corresponding IP network to which the node is connected. Each of the these IP networks is identified by a corresponding network identifier. Further, the node is adapted to receive, in response to a request sent by the node, connection information of a further node of the communication network. The received connection information comprises at least one network identifier and an associated IP address of the further node. Further, the node is adapted to, based on the at least one network identifier, select one of the IP networks. Further, the node is adapted to establish, via the selected IP network and based on the associated IP address, an IP based connection to the further node.

According to a further embodiment of the invention, a node for a communication network is provided. The node is adapted to send connection information of the node in response to a request received by the node. The sent connection information comprises at least one network identifier identifying an IP network to which the node is connected and an IP address of the node associated with this IP network. The sent connection information enables a further node of the communication network to establish an IP based connection to the node.

According to a further embodiment of the invention, a node for a communication network is provided. The node is adapted to receive a request from a first further node of the communication network. The first further node has multiple IP addresses. Each of the multiple IP addresses is associated with a corresponding IP network to which the first further node is connected. Each of the these IP networks is identified by a corresponding network identifier. Further, the node is adapted to send, in response to the request, connection information to the first further node. The sent connection information comprises at least one network identifier identifying at least one of the IP networks to which the first further node is connected, and to which also the second further node is connected. Further, the sent connection information comprises an IP address of the second further node associated with the at least one IP network. The sent connection information enables the first further node to establish an IP based connection to the second further node.

According to a further embodiment of the invention, a system is provided. The system comprises a first node of a wireless communication network, a second node of the wireless communication network, and a further node of the wireless communication network. The first node has multiple IP addresses. Each of the multiple IP addresses is associated with a corresponding IP network to which the first node is connected. Each of the these IP networks is identified by a corresponding network identifier. The first node is adapted to send a request to the further node, and in response to the request, receive connection information of the second node. The received connection information comprises at least one network identifier and an associated IP address of the second node. Further, the first node is adapted to select one of the IP networks based on the at least one network identifier, and via the selected Internet Protocol network and based on the associated IP address, establish an IP based connection to the second node. The further node is adapted to receive the request from the first node and, in response to the request, send the connection information of the second node to the first node.

According to a further embodiment of the invention, a computer program or computer program product is provided, e.g., in the form of a non-transitory storage medium, which comprises program code to be executed by at least one processor of a node of a communication network. Execution of the program code causes the node to configure multiple IP addresses of the node. Each of the multiple IP addresses is associated with a corresponding IP network to which the node is connected. Each of the these IP networks is identified by a corresponding network identifier. Further, execution of the program code causes the node to, in response to a request sent by the node, receive connection information of a further node of the communication network. The received connection information comprises at least one network identifier and an associated IP address of the further node. Further, execution of the program code causes the node to, based on the at least one network identifier, select one of the IP networks. Further, execution of the program code causes the node to establish, via the selected IP network and based on the associated IP address, an IP based connection to the further node.

According to a further embodiment of the invention, a computer program or computer program product is provided, e.g., in the form of a non-transitory storage medium, which comprises program code to be executed by at least one processor of a node of a communication network. Execution of the program code causes the node to send connection information of the node in response to a request received by the node. The sent connection information comprises at least one network identifier identifying an IP network to which the node is connected and an IP address of the node associated with this IP network. The sent connection information enables a further node of the communication network to establish an IP based connection to the node.

According to a further embodiment of the invention, a computer program or computer program product is provided, e.g., in the form of a non-transitory storage medium, which comprises program code to be executed by at least one processor of a node of a communication network. Execution of the program code causes the node to receive a request from a first further node of the communication network. The first further node has multiple IP addresses. Each of the multiple IP addresses is associated with a corresponding IP network to which the first further node is connected. Each of the these IP networks is identified by a corresponding network identifier. Further, execution of the program code causes the node to send, in response to the request, connection information to the first further node. The sent connection information comprises at least one network identifier identifying at least one of the IP networks to which the first further node is connected, and to which also the second further node is connected. Further, the sent connection information comprises an IP address of the second further node associated with the at least one IP network. The sent connection information enables the first further node to establish an IP based connection to the second further node.

Details of such embodiments and further embodiments will be apparent from the following detailed description of embodiments and the accompanying drawings.

DETAILED DESCRIPTION OF EMBODIMENTS

Figure 1:
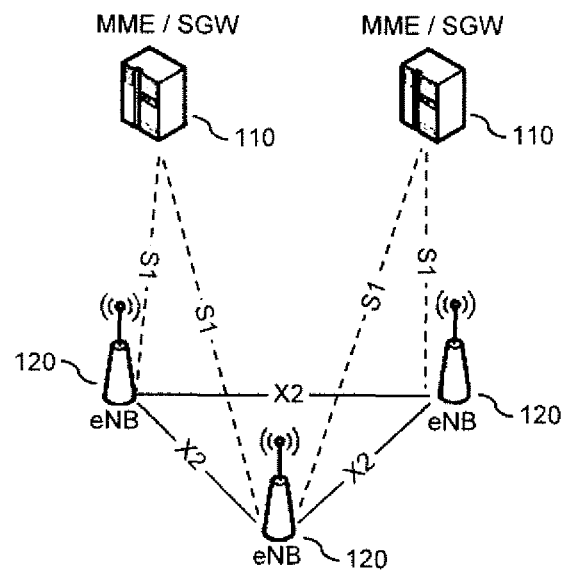
FIG. 1 schematically illustrates an example of a communication network in which connection establishment can be controlled according to an embodiment of the invention.

In the following, concepts in accordance with exemplary embodiments of the invention will be explained in more detail and with reference to the accompanying drawings. The illustrated embodiments relate to establishment of an IP based connection between nodes of a communication network. In the examples as further illustrated below, the communication network is assumed to be a wireless communication network, e.g., a wireless communication network based on the LTE technology or a 5G ($5^{th}$ Generation) wireless communication network based on a newer solution of the LTE technology or a next-generation radio technology, also referred to as NR (New Radio) technology. In this case, the IP based connection may be established between two nodes of a RAN part of the wireless communication network, such as eNBs of the LTE technology or access nodes of a 5G radio access technology. However, it is to be understood that the illustrated concepts could also be applied to other kinds of communication networks, e.g., based on other kinds of wireless technologies and/or wire based technologies.

The illustrated concepts aim at efficiently enabling a first node of the communication network to establish and IP based connection to a second node of the communication network in scenarios where the first node is connected to multiple IP networks or both the first node and the second node are connected to multiple IP networks. Each of the different IP networks, a corresponding IP address is assigned to the first node, and these multiple IP addresses of the first node may differ from each other. Similarly, if the second node is connected to multiple IP networks, for each of the different IP networks a corresponding IP address may be assigned to the second node, and these multiple IP addresses of the second node may differ from each other. Accordingly, when the first node establishes the IP based connection to the second node it selects one of the IP networks to which it is connected for establishing the IP based connection and uses the IP address assigned in this IP network to the second node for establishing the IP based connection to the second node. For this purpose, a corresponding network identifier is associated with each of the different IP networks. The network identifiers allow for identifying each of the different IP networks. The network identifiers may for example correspond to VLAN (Virtual Local Area Network) tags. However, other kinds of identifiers, such as names or numbers uniquely identifying the IP networks, could be utilized as well.

Before establishing the IP based connection, the first node requests connection information of the second node. The connection information includes a network identifier, which identifies one of the IP networks to which the second node is connected. Further, the connection information includes the IP address of the second node in this IP network. In some scenarios, the connection information may also include multiple network identifiers, which each identify one of multiple IP networks to which the second node is connected. In this case, the connection information also includes, for each of the IP networks identified by the network identifiers, the IP address of the second node in the identified IP network. Based on the connection information, the first node may then select one of the IP networks and use the corresponding IP address of the second node for establishing the IP based connection. This may involve that the first node uses the connection information to identify one of the multiple different IP networks to which those the first node and the second node are connected.

The first node may request the connection information from a further node of the communication network. For example, in the above-mentioned scenario where the first node and the second node are nodes of the RAN part of the wireless communication network, the first node may request the connection information from a node of a core network (CN) part of the wireless communication network, e.g., from an MME or S-GW (Serving Gateway) of the LTE technology or from a centralized management node. For providing the connection information to the first node, the further node may also request information from the second node. This information requested from the second node may correspond to the connection information provided to the first node may be used by the further node for determining the connection information, e.g., by selecting the connection information from the information provided by the second node.

FIG. 1 schematically illustrates an example of a communication network in which the above concepts for enabling establishment of an IP based connection may be applied. In the example of FIG. 1 the communication network is assumed to be a wireless communication network based on the LTE technology and includes a CN part with MME/S-GWs 110 and a RAN part with eNBs 120. As illustrated, the eNBs 120 are connected to each other by X2 interfaces, which are IP based connections. The X2 interfaces may be implemented in accordance with 3GPP TS 36.420 V13.0.0 (2015-12). Further, each of the eNBs 120 is connected by an S1 interface to at least one of the MME/S-GWs 110. The S1 interfaces may be implemented in accordance with 3GPP TS 36.410 V13.0.0 (2015-12). The X2 interfaces and the S1 interfaces may be established through multiple different IP networks. For example, the eNBs 120 could be shared by multiple operators, and each operator could use an individual IP network for the X2 and S1 interfaces. In this case, the illustrated MME/S-GWs 110 could each be associated to a different operator.

In the example of FIG. 1, a first one of the eNBs 120 may request the connection information via the S1 interface from one of the MME/S-GWs 110 and use the connection information to establish the X2 interface to a second one of the eNBs 120. As mentioned above, the connection information of the second eNB 120 includes one or more network identifiers of IP networks to which the second eNB 120 is connected and the corresponding IP address(es) of the second eNB 120. The connection information may be conveyed in an S1 message referred to as "MME configuration transfer" and in an information element referred to as "X2 TNL Configuration Info", as defined in 3GPP TS 36.413 V13.3.0 (2016-06). However, other kinds of information elements or messages could be used as well. The MME/S-GW 110 may determine the connection information by requesting information from the second eNB 120. The information requested from the second eNB 120 may include one or more network identifiers of IP networks to which the second eNB 120 is connected and the corresponding IP address(es) of the second eNB 120. The latter information may be conveyed in an S1 message referred to as "eNB configuration transfer" and in an information element referred to as "X2 TNL Configuration Info", as defined in 3GPP TS 36.413 V13.3.0 (2016-06). However, other kinds of information elements or messages could be used as well.

Based on the connection information, the first eNB 120 may establish the X2 interface to the second eNB 120. For this purpose, the first eNB 120 may also use configuration information stored in the first eNB 120. This configuration information may define multiple IP addresses of the first node, each IP address being associated with a network identifier identifying the IP network in which the IP address is applicable. Further, this configuration information may include multiple LAN (Local Area Network) configurations, each LAN configuration being associated with a network identifier identifying the IP network in which the LAN configuration is applicable. The LAN configurations may for example each define a subnet mask, a a DNS (Domain Name System) address, a physical port, or the like. Further, this configuration information may also include rules defining which IP network shall be used depending on type of connection and/or type of protocol. For example, the X2 interface may carry traffic based on the X2 control plane protocol, also referred to as X2-CP, or traffic based on the X2 user plane protocol, also referred to as X2-UP. A rule may then be defined by associating the different protocol types to different network identifiers, so that the X2 interface for X2-CP based traffic is established via another IP network than the X2 interface for X2-UP traffic.

Figure 2:
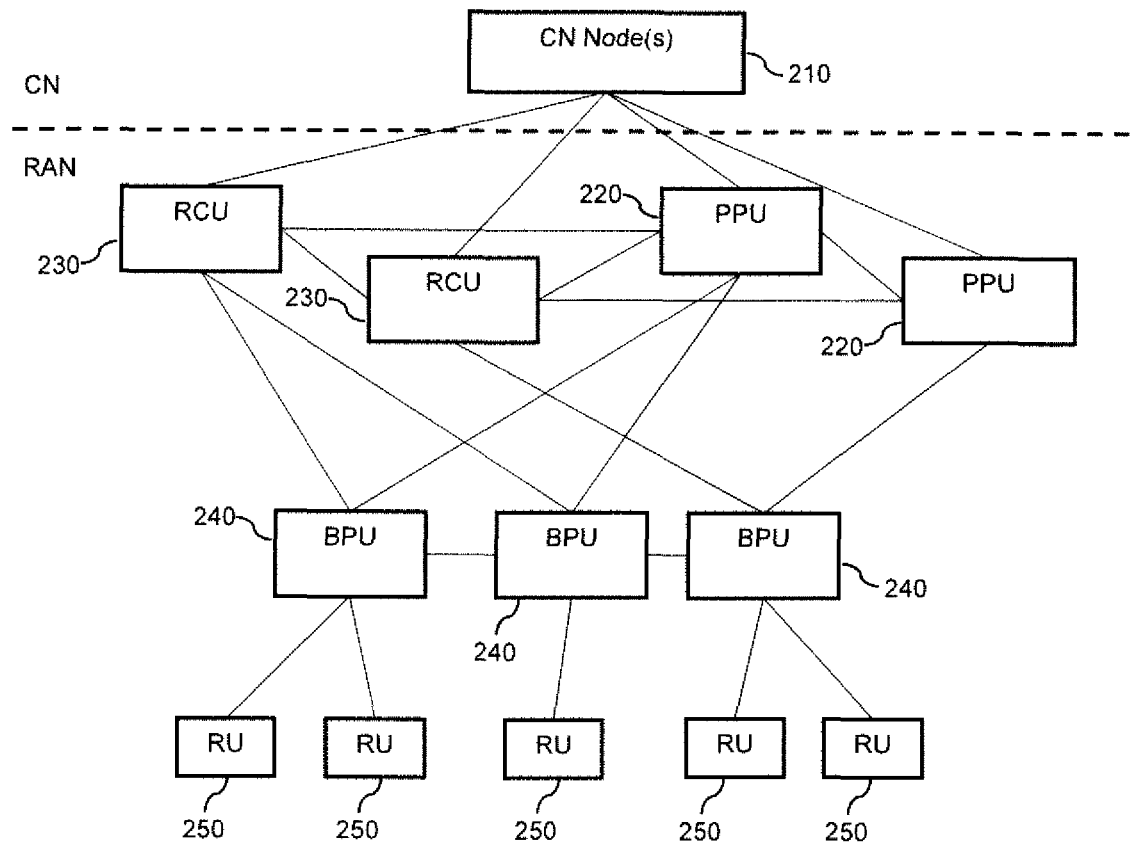
FIG. 2 schematically illustrates a further example of a communication network in which connection establishment can be controlled according to an embodiment of the invention.

FIG. 2 schematically illustrates a further example of a communication network in which the above concepts for enabling establishment of an IP based connection may be applied. In the example of FIG. 2 the communication network is assumed to be a wireless communication network based on a radio access technology in which functionalities of the RAN are distributed to different nodes. Specifically, FIG. 2 illustrates one or more nodes 210 of the CN part of the wireless communication network and nodes 220, 230, 240, 250 of the RAN part of the wireless communication network. The RAN part includes nodes 220 implementing packet processing functionalities, referred to as PPU (Packet Processing Unit), nodes 230 implementing radio control functionalities, referred to as RCU (Radio Control Unit), nodes 240 implementing baseband processing functionalities, referred to as BPU (Baseband Processing Unit), and nodes 250 implementing radio front-end functionalities, referred to as RU (Radio Unit). Such distributed RAN architecture could for example be used for a 5G wireless communication network. In this distributed architecture, at least some of the above functionalities may be implemented by cloud-based processing. The interfaces between the nodes 220, 230, 240, 250 may be established through multiple different IP networks. For example, also in this case, the nodes 220, 230, 240, 250 could be shared by multiple operators, and each operator could use an individual IP network for providing the interfaces between the nodes 220, 230, 240, 250.

In the example of FIG. 2, a first one of the nodes 220, 230, 240, 250 may request the connection information from one of the CN nodes 210 and use the connection information to establish the interface to a second one nodes 220, 230, 240, 250. As mentioned above, the connection information of the second node 220, 230, 240, 250 includes one or more network identifiers of IP networks to which the node 220, 230, 240, 250 is connected and the corresponding IP address (es) of the second node 220, 230, 240, 250. The CN node 210 may determine the connection information by requesting information from the second node 220, 230, 240, 250. The information requested from the second node 220, 230, 240, 250 may include one or more network identifiers of IP networks to which the second node 220, 230, 240, 250 is connected and the corresponding IP address(es) of the second node 220, 230, 240, 250.

Figure 3:
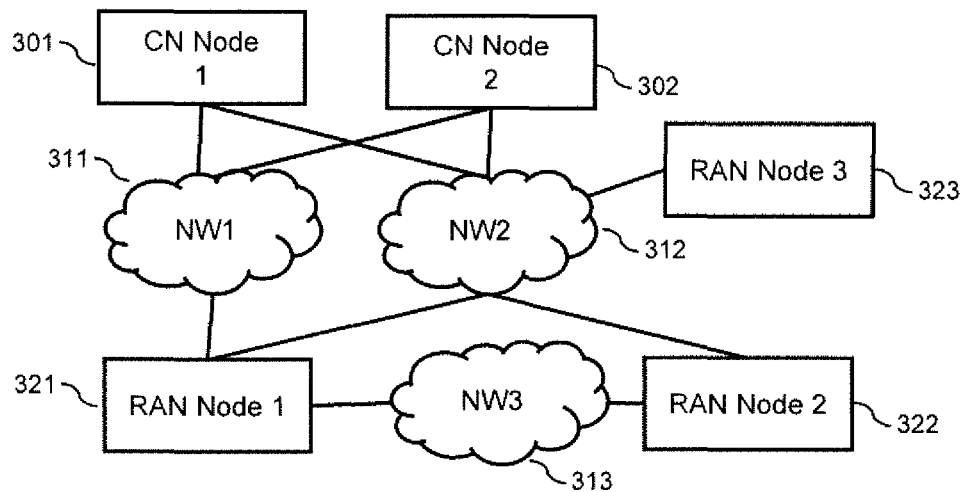
FIG. 3 schematically illustrates an exemplary scenario in which network nodes are connected via multiple different IP networks.

FIG. 3 schematically illustrates how the multiple RAN nodes of the wireless communication network may be connected via multiple different IP networks. In particular, the FIG. 3 illustrates CN nodes 301, 302 and RAN nodes 321, 322, 323, which are connected via IP networks 311, 312, 313. The CN nodes 301, 302 may for example correspond to the MME/S-GWs 110 of FIG. 1, and the RAN nodes 321, 322, 323 could then correspond to the eNBs 120 of FIG. 1. Further, the CN nodes 301, 302 could correspond to the CN nodes 210 of FIG. 2, and the RAN nodes 321, 322, 323 could then correspond to some of the nodes 220, 230, 240, 250 of FIG. 2, e.g., to the BPUs 240.

In the illustrated example, the CN node 301 is connected to the IP networks 311 and 312, and the CN node 302 is connected to the IP networks 311 and 312. The RAN node 321 is connected to the IP networks 311, 312, and 313. The RAN node 322 is connected to the IP networks 312 and 313. The RAN node 323 is connected to the IP network 313. In each of the different IP networks 311, 312, and 313, corresponding IP addresses are assigned to the nodes 301, 302, 311, 312, 313. Accordingly, if a node is connected to multiple different IP networks, it may have multiple IP addresses which are different from each other.

When for example the RAN node 321 needs to establish an IP based connection to the RAN node 322, this IP based connection could be established either via the IP network 312 or via the IP network 313. If the IP based connection is established via the IP network 312, the RAN node 321 would use the IP address assigned to the RAN node 321 in the IP network 312 and the IP address assigned to the RAN node 322 in the IP network 312 for establishing the IP based connection. If the IP based connection is established via the IP network 313, the RAN node 321 would use the IP address assigned to the ran node 321 in the IP network 313 and the IP address assigned to the RAN node 322 in the IP network 313 for establishing the IP based connection. Before establishing the IP based connection, the ran node 321 may request the connection information from the CN node 301, which in turn may provide the connection information on the basis of information requested from the RAN node 322. Based on the received connection information, the RAN node 321 can decide which of the IP networks 312, 313 to use for establishing the IP based connection and choose the corresponding IP addresses for establishing the IP based connection.

Figure 4:
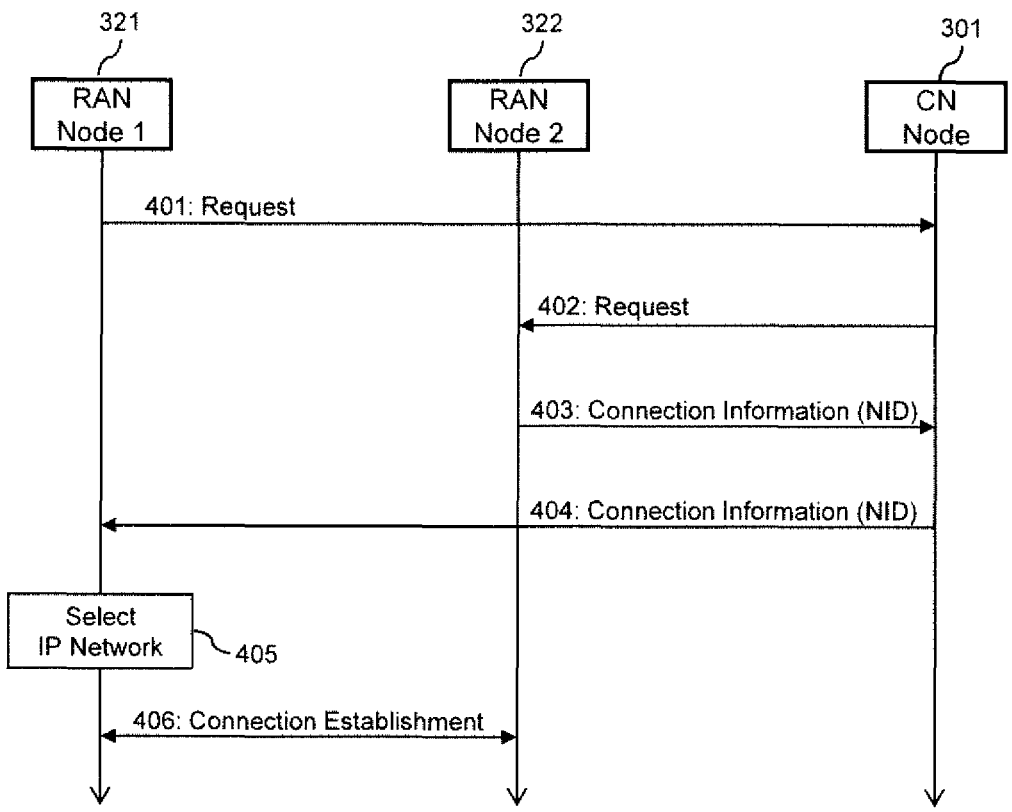
FIG. 4 schematically illustrates an example of processes according to an embodiment of the invention.

FIG. 4 shows an example of processes which are based on the concepts as outlined above. The processes of figure for involve the RAN node 321, in the following referred to as first RAN node, the RAN node 322, and the following referred to as second RAN node, and the CN node 301.

In the example FIG. 4, it is assumed that the first RAN node 321 needs to establish an IP based connection to the second RAN node 322. For example, this need may be triggered by the first RAN node 321 automatically detecting the second RAN node 322 as a new neighbor node.

As illustrated, the first RAN node 321 sends a request 401 to the CN node 301. By the request 401, the first RAN node 321 requests the connection information of the second RAN node 322 from the CN node 301. If the first RAN node 321 is an eNB and the CN node 301 is an MME to which the first RAN node 321 is connected via the S1 interface, the request 401 may be provided in an eNB Configuration Transfer message, in particular in an SON (Self Organizing Network) Information Request included in an SON Configuration Transfer Container, as defined in 3GPP TS 36.413 V13.3.0. The request 401 may also include connection information of the first RAN node 321, in particular network identifiers of the IP networks 311, 312, 313 to which the first RAN node is connected and the IP addresses of the first RAN node 321 in these IP networks 311, 312, 313.

Upon receiving the request 401, the CN node 301 sends a further request 402 to the second RAN node 322. By the request 402, the CN node 301 requests the connection information of the second RAN node 322 from the second RAN node 322. If the CN node 301 is an MME and the second RAN node 322 is an eNB to which the CN node 301 is connected via the S1 interface, the request 402 may be provided in an MME Configuration Transfer message, in particular in an SON Information Request included in an SON Configuration Transfer Container, as defined in 3GPP TS 36.413 V13.3.0. The request 402 may also include connection information of the first RAN node 321, in particular network identifiers of the IP networks 311, 312, 313 to which the first RAN node is connected and the IP addresses of the first RAN node 321 in these IP networks 311, 312, 313.

Upon receiving the request 402, the second RAN node 322 sends the requested connection information 403 to the CN node 301. If the second RAN node 322 is an eNB and the CN node 301 is an MME to which the second RAN node 322 is connected via the S1 interface, the connection information 403 may be provided in an eNB Configuration Transfer message, in particular in the X2 TNL Configuration Info information element of an SON Information Reply included in an SON Configuration Transfer Container, as defined in 3GPP TS 36.413 V13.3.0.

If the second RAN node 322 is connected to multiple IP networks, like in the illustrated example to the IP networks 312 and 313, the connection information 403 sent from the second RAN node 322 to the CN node 301 may include multiple network identifiers, each identifying one of the multiple IP networks 312, 313 to which the second RAN node 322 is connected, and the respective associated IP address of the second RAN node 322. In some cases, the second RAN node 322 may also select one or more of the IP networks 312, 313 to which it is connected and include only the network identifier and the respective associated IP address of the selected IP network(s) 312, 313 into the connection information 403 sent to the CN node 301. For example, in the illustrated scenario the second RAN node 322 could select one of the IP networks 312, 313 and include the network identifier of the selected IP network 312, 313 and the associated IP address of the second RAN node 322 into the connection information 403 sent to the CN node 301. This selection may also consider information received with the request 402, e.g., connection information of the first RAN node 321. The selection may for example be accomplished on the basis of a rule configured in the second RAN node 322. Such rule may for example be configured for selecting one or more IP networks to which both the first RAN node 321 and the second RAN node 322 are connected. Further, such rule may consider other criteria, such as type of the IP based connection to be established and/or protocol type used on the IP based connection to be established.

Having received the connection information 403 from the second RAN node 322, the CN node 301 responds to the request 401 by sending the requested connection information 404 to the first RAN node 321. If the CN node 301 is an MME and the first RAN node 321 is an eNB to which the CN node 301 is connected via the S1 interface, the connection information 403 may be provided in an MME Configuration Transfer message, in particular in the X2 TNL Configuration Info information element of an SON Information Reply included in an SON Configuration Transfer Container, as defined in 3GPP TS 36.413 V13.3.0.

If the second RAN node 322 is connected to multiple IP networks, like in the illustrated example to the IP networks 312 and 313, the connection information 404 sent from the CN node 301 to the first RAN node 321 may include multiple network identifiers, each identifying one of the multiple IP networks 312, 313 to which the second RAN node 322 is connected, and the respective associated IP address of the second RAN node 322. In some cases, the CN node 301 may also select one or more of the IP networks 312, 313 to which the second RAN node 322 is connected and include only the network identifier and the respective associated IP address of the selected IP network(s) 312, 313 into the connection information 404 sent to the first RAN node 321. For example, in the illustrated scenario the second CN node 301 could select one of the IP networks 312, 313 and include the network identifier of the selected IP network 312, 313 and the associated IP address of the second RAN node 322 into the connection information 404 sent to the first RAN node 321. This selection may also consider information received with the request 401, e.g., connection information of the first RAN node 321. The selection may for example be accomplished on the basis of a rule configured in the CN node 301. Such rule may for example be configured for selecting one or more IP networks to which both the first RAN node 321 and the second RAN node 322 are connected. Further, such rule may consider other criteria, such as type of the IP based connection to be established and/or protocol type used on the IP based connection to be established.

Based on the received connection information 404, the first RAN node 321 selects one of the IP networks 311, 312, 313 to which it is connected for establishing the connection to the second ran node 322, as illustrated by block 405. If the received connection information 404 includes only one network identifier and associated IP address of the second RAN node 322, the first ran node 321 may select the IP network 311, 312, 313 which is identified by this single network identifier. In scenarios where the received connection information 404 includes multiple network identifiers and the respective associated IP address of the second RAN node 322, the first RAN node 322 may select one IP network 311, 312, 313 among the multiple IP networks 311, 312, 313 identified by these multiple network identifiers. This may for example be accomplished on the basis of a rule configured in the first eNB 321. Such rule may for example be configured for selecting an IP network to which both the first RAN node 321 and the second RAN node 322 are connected. Further, such rule may consider other criteria, such as type of the IP based connection to be established and/or protocol type used on the IP based connection to be established. In the illustrated example, the first RAN node 321 may select one of the IP networks 312, 313.

Having selected one of the multiple IP networks 311, 312, 313, the first RAN node 321 may proceed to establish the IP based connection to the second RAN node 322, as illustrated by signalling 406. If the first RAN node 321 and the second RAN node 322 are eNBs and the IP based connection to be established is the X2 interface between these eNBs, signalling 406 may for example involve that the first RAN node 321 sends an X2 Setup Request message to the IP address of the second RAN node in the selected IP network 312, 313 and receives an X2 Setup Response from the second RAN node 322, as for example defined in 3GPP TS 36.423 V13.4.0 (2016-06).

It is noted that in some scenarios sending of the further request 402 and the connection information 403 may not be needed. For example, when receiving the request 401, the connection information of the second RAN node 322 could already be available at the CN node 301, e.g., from earlier interactions of the CN node 301 with the second RAN node 322. Accordingly, the CN node 301 could check if the requested connection information is already available and send the further request 402 only if this is not the case.

It is also noted that in some scenarios there may already be an existing connection between the RAN nodes 321 and 322, but one or more additional IP based connections are needed. The additional IP based connection(s) could for example be needed for other types of communication. In these scenarios the request 401 and connection information 404 can be sent on the existing connection between RAN nodes 321 and 322, not passing any intermediate node such as the CN node 301. One example of this type of scenario is a Handover Preparation procedure as for example described in 3GPP TS 36.423 V13.4.0 (2016-06), chapter 8.2.1. The request for the connection information could then be included in the Handover Request message and the response with the connection information in the Handover Request Acknowledge message. The connection information could for example be included in an information element referred to as "GTP Tunnel Endpoint".

Figure 5:
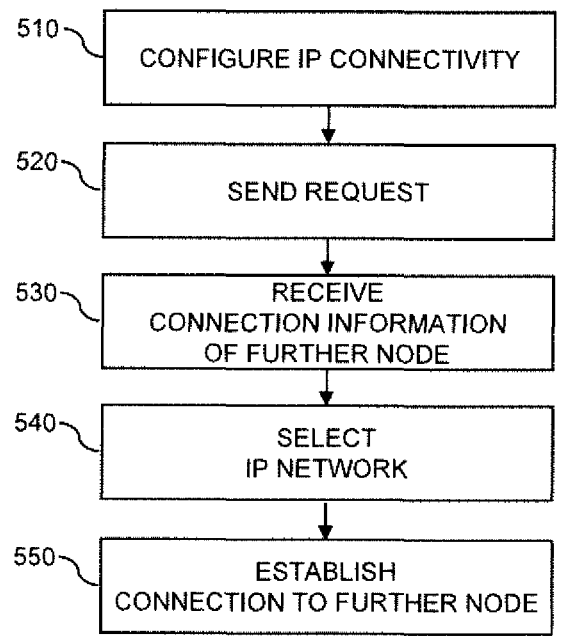
FIG. 5 shows a flowchart for schematically illustrating a method according to an embodiment of the invention.

FIG. 5 shows a flowchart for illustrating a method of controlling connection establishment. The method of FIG. 5 may be utilized for implementing the illustrated concepts in a node of a communication network which establishes an IP based connection to a further node of the communication network. The node and the further node may for example each correspond to one of the above-mentioned nodes 120, 220, 230, 240, 250, 321, 322, 323. Accordingly, the node and the further node may correspond to nodes of a RAN part of a wireless communication network, e.g., to eNBs of the LTE technology or to access nodes of a 5G radio access technology. If the node and the further node correspond to eNBs, the IP based connection to be established may be an X2 interface between these eNBs. However, it is noted that the method could also be applied for other types of nodes of a communication network and to various kinds of IP based connections. If a processor-based implementation of the node is used, the steps of the method may be performed by one or more processors of the node. In such a case the node may further comprise a memory in which program code for implementing the below described functionalities is stored.

At step 510, the node configures IP connectivity of the node. Specifically, the node configures multiple IP addresses of the node. Each of the multiple IP addresses is associated with a corresponding IP network to which the node is connected, such as the above-mentioned IP networks 311, 312, 313. Each of the these IP networks is identified by a corresponding network identifier. The network identifiers may correspond to VLAN tags. A mapping of network identifiers to the IP networks may be configured in the node, e.g., based on control information provided to the node and/or based on operator settings.

At step 520, the node sends a request for connection information of the further node. An example of such request is the above-mentioned request 401. If the node is a node of a RAN part of a wireless communication network, the node may send the request to a node of a CN part of the wireless communication network, such as one of the above-mentioned CN nodes 110, 210, 301, or 302. For example, the node of the CN part of the wireless communication network could include or correspond to an MME or S-GW. However, it is noted that the request could also be sent to other kinds of nodes, e.g., to a centralized management node. Further, in some scenarios the request could also be sent to the further node, e.g., via an existing connection between the node and the further node.

In some scenarios, the request may include the network identifiers identifying the IP networks to which the node is connected. Optionally, the request may also include the respective associated IP address of the node for each of the IP networks. As used herein an "IP address of a node associated with an IP network" refers to the IP address which is assigned to the node in this IP network and thus can be used to identify the node as source or destination of IP data packets. Similarly, an "IP address of a node associated with a network identifier" refers to the IP address which is assigned to the node in the IP network identified by the network identifier.

At step 530, the node receives the connection information of the further node in response to the request of step 520. The received connection information includes at least one network identifier and an associated IP address of the further node.

In some scenarios, the received connection information of the further node includes only one network identifier and associated IP address of the further node. In other scenarios, the received connection information includes multiple network identifiers and, for each of the network identifiers, an associated IP address of the further node.

At step 540, based on the at least one network identifier, the node selects one of the IP networks. If the received connection information includes only one network identifier and associated IP address of the further node, the selected IP network may be that one of the IP networks which is identified by the network identifier received in the connection information.

If the received connection information includes multiple network identifiers and, for each of the network identifiers, an associated IP address of the further node, the selected IP network may be identified by one of the network identifiers received in the connection information. In this case, the node may apply a rule configured in the node for selecting the IP network from the multiple identified IP networks, e.g., a rule which aims at identifying an IP network to which both the node and the further node are connected. In some scenarios, such rule could also be based on other criteria, e.g., a type of the IP based connection to be established between the node and the further node and/or a protocol type used on the IP based connection to be established between the node and the further node.

At step 550, the node establishes the IP based connection to the further node via the selected IP network and based on the associated IP address. This may involve sending a connection setup message to the IP address of the further node.

Figure 6:
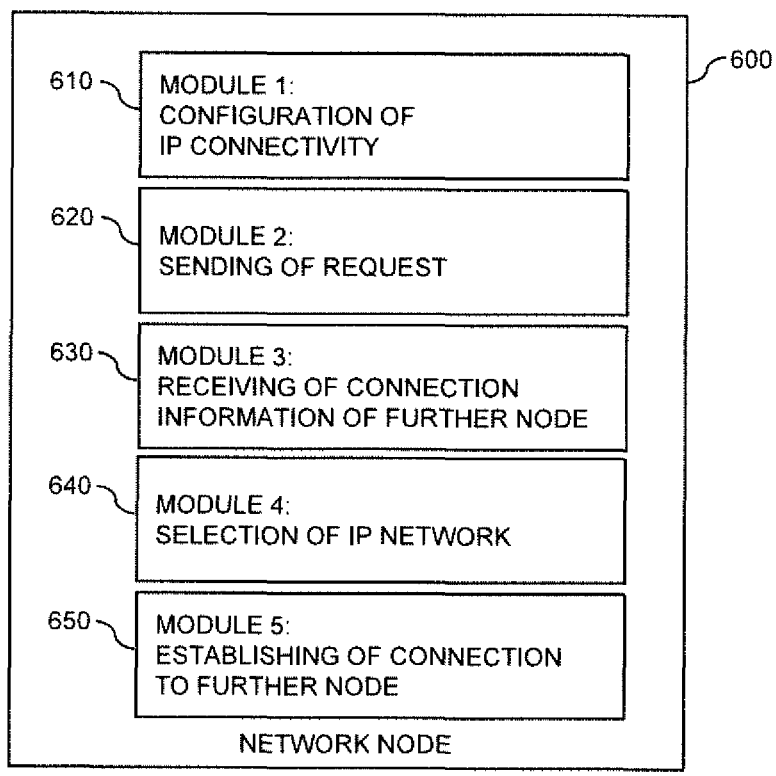
FIG. 6 shows a block diagram for illustrating functionalities of a radio device according to an embodiment of the invention.

FIG. 6 shows a block diagram for illustrating functionalities of a network node 600 which operates according to the method of FIG. 5. As illustrated, the network node 600 may be provided with a module 610 adapted to configure multiple IP addresses of the network node, each of the multiple IP addresses corresponding to one of multiple IP networks to which the network node is connected, such as explained in connection with step 510. Further, the network node 600 may be provided with a module 620 adapted to send a request for connection information, such as explained in connection with step 520. Further, the network node 600 may be provided with a module 630 adapted to receive the connection information in response to the request, such as explained in connection with step 530. Further, the network node 600 may be provided with a module 640 adapted to select one of the IP networks based on the received connection information, such as explained in connection with step 540. Further, the network node 600 may be provided with a module 650 adapted to establish an IP based connection via the selected IP network, such as explained in connection with step 550.

It is noted that the network node 600 may include further modules for implementing other functionalities, such as known functionalities of a RAN node, such as an eNB. Further, it is noted that the modules of the network node 600 do not necessarily represent a hardware structure of the network node 600, but may also correspond to functional elements, e.g., implemented by hardware, software, or a combination thereof.

Figure 7:
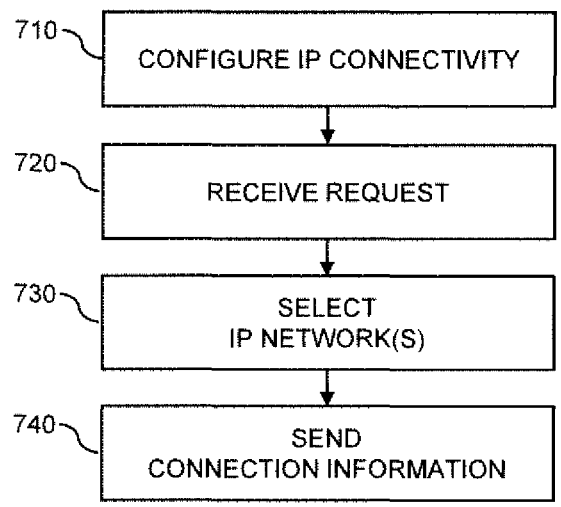
FIG. 7 shows a flowchart for schematically illustrating a further method according to an embodiment of the invention.

FIG. 7 shows a flowchart for illustrating a further method of controlling connection establishment. The method of FIG. 7 may be utilized for implementing the illustrated concepts in a node of a communication network to which another node of the communication network needs to establish an IP based connection. The node and the further node may for example each correspond to one of the above-mentioned nodes 120, 220, 230, 240, 250, 321, 322, 323. Accordingly, the node and the further node may correspond to nodes of a RAN part of a wireless communication network, e.g., eNBs of the LTE technology or to access nodes of a 5G radio access technology. If the node and the further node correspond to eNBs, the IP based connection to be established may be an X2 interface between these eNBs. However, it is noted that the method could also be applied for other types of nodes of a communication network and to various kinds of IP based connections. If a processor-based implementation of the node is used, the steps of the method may be performed by one or more processors of the node. In such a case the node may further comprise a memory in which program code for implementing the below described functionalities is stored.

At step 710, the node configures IP connectivity of the node. Specifically, the node may configure multiple IP addresses of the node. Each of the multiple IP addresses is associated with a corresponding IP network to which the node is connected, such as the above-mentioned IP networks 311, 312, 313. Each of the these IP networks is identified by a corresponding network identifier. The network identifiers may correspond to VLAN tags. A mapping of network identifiers to the IP networks may be configured in the node, e.g., based on control information provided to the node and/or based on operator settings. However, in some scenarios the node may also be connected to only one IP network, while the further node is connected to multiple IP networks.

At step 720, the node receives a request for connection information of the node. An example of such request is the above-mentioned request 402. If the node is a node of a RAN part of a wireless communication network, the node may receive the request from a node of a CN part of the wireless communication network, such as one of the above-mentioned CN nodes 110, 210, 301, or 302. For example, the node of the CN part of the wireless communication network could include or correspond to an MME or S-GW. However, it is noted that the request could also be received from other kinds of nodes, e.g., from a centralized management node. Further, in some scenarios the request could also be received from the further node, e.g., via an existing connection between the node and the further node.

In some scenarios, the request may include the network identifiers identifying the IP networks to which the further node is connected. Optionally, the request may also include the respective associated IP address of the further node for each of the IP networks.

If the node is connected to multiple IP networks the node may at step 730 optionally select one or more of these IP networks. In this case, the node may apply a rule configured in the node for selecting the IP network from the multiple IP networks to which the node is connected, e.g., a rule which aims at identifying an IP network to which both the node and the further node are connected. For this purpose, the node may utilize network identifiers identifying the IP networks to which the further node is connected, e.g., as received in the request of step 720. In some scenarios, such rule could also be based on other criteria, e.g., a type of the IP based connection to be established between the node and the further node and/or a protocol type used on the IP based connection to be established between the node and the further node.

At step 740, the node sends the connection information of the node in response to the request of step 720. The sent connection information includes at least one network identifier, identifying an IP network to which the node is connected and an IP address of the node associated with this IP network. The network identifier(s) may identify the IP network(s) selected at step 730. If the node is connected to only one IP network, the sent connection information may include the network identifier identifying this IP network and the IP address of the node associated with this IP network. If the node is connected to multiple IP networks, the sent connection information may include at least one of the network identifiers identifying at least one of these multiple IP networks and the IP address of the node associated with the identified IP networks. The sent connection information enables the further node to establish the IP based connection to the node. This may involve that the further node sends a connection setup message to the IP address of the node.

Figure 8:
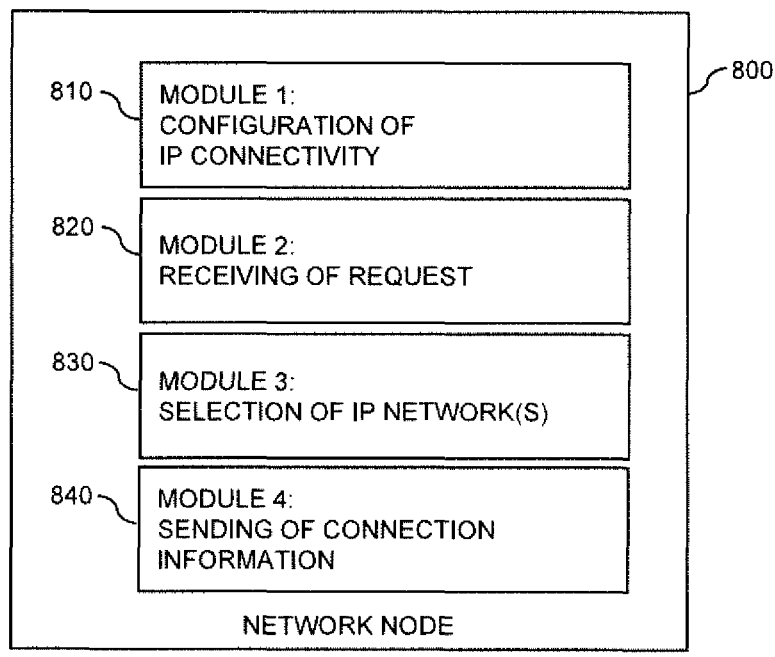
FIG. 8 shows a block diagram for illustrating functionalities of a network node according to an embodiment of the invention.

FIG. 8 shows a block diagram for illustrating functionalities of a network node 800 which operates according to the method of FIG. 7. As illustrated, the network node 800 may optionally be provided with a module 810 adapted to configure one or more IP addresses of the network node, such as explained in connection with step 710. Further, the network node 800 may be provided with a module 820 adapted to receive a request for connection information, such as explained in connection with step 720. Further, the network node 800 may optionally be provided with a module 730 adapted to select at least one IP network from multiple IP networks to which the network node is connected, such as explained in connection with step 730. Further, the network node 800 may be provided with a module 840 adapted to send the requested connection information, such as explained in connection with step 740.

It is noted that the network node 800 may include further modules for implementing other functionalities, such as known functionalities of a RAN node, such as an eNB. Further, it is noted that the modules of the network node 800 do not necessarily represent a hardware structure of the network node 800, but may also correspond to functional elements, e.g., implemented by hardware, software, or a combination thereof.

Figure 9:
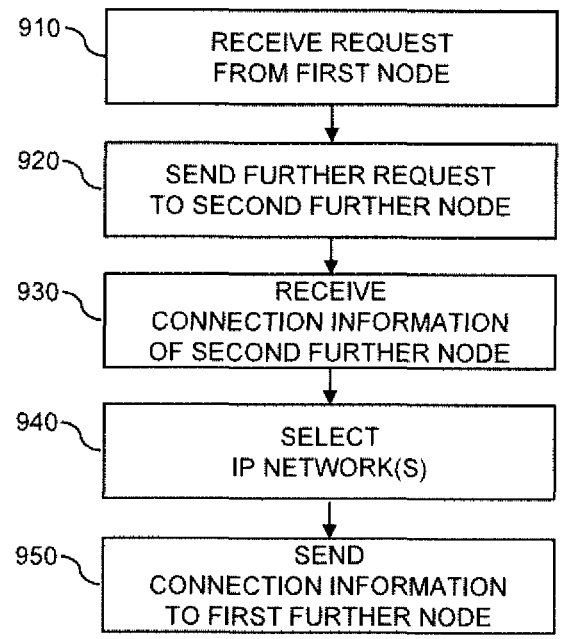
FIG. 9 shows a flowchart for schematically illustrating a further method according to an embodiment of the invention.

FIG. 9 shows a flowchart for illustrating a further method of controlling connection establishment. The method of FIG. 9 may be utilized for implementing the illustrated concepts in a node of a communication network which communicates with a first further node of the communication network which needs to establish an IP based connection to a second further node of the communication network. In some scenarios, the node may also communicate with the second further node. The first further node and the second further node may for example each correspond to one of the above-mentioned nodes 120, 220, 230, 240, 250, 321, 322, 323. Accordingly, the node and the further node may correspond to nodes of a RAN part of a wireless communication network, e.g., to eNBs of the LTE technology or to access nodes of a 5G radio access technology. The node may then correspond to a node of a CN part of the wireless communication network, such as one of the above-mentioned CN nodes 110, 210, 301, or 302. For example, the node could include or correspond to an MME or S-GW. However, it is noted that the node could also correspond to other kinds of nodes, e.g., a centralized management node. If the first further node and the second further node correspond to eNBs, the IP based connection to be established may be an X2 interface between these eNBs. However, it is noted that the method could also be applied for other types of nodes of a communication network and to various kinds of IP based connections. If a processor-based implementation of the node is used, the steps of the method may be performed by one or more processors of the node. In such a case the node may further comprise a memory in which program code for implementing the below described functionalities is stored.

At step 910, the node receives a request from the first further node. The first further node has multiple IP addresses. Each of the multiple IP addresses is associated with a corresponding IP network to which the first further node is connected, such as the above-mentioned IP networks 311, 312, 313. In some scenarios also the second further node has multiple IP addresses, of which each is associated with a corresponding IP network to which the second further node is connected. Each of the these IP networks is identified by a corresponding network identifier. The network identifiers may correspond to VLAN tags. A mapping of network identifiers to the IP networks may be configured in the node, e.g., based on control information provided to the node and/or based on operator settings. An example of the request received at step 910 is the above-mentioned request 401.

In some scenarios, the request may include the network identifiers identifying the IP networks to which the first further node is connected. Optionally, the request may also include the respective associated IP address of the first further node for each of the IP networks.

At step 920, the node may optionally send a further request to the second further node. An example of such further request is the above-mentioned request 402. Also the further request may include the network identifiers identifying the IP networks to which the first further node is connected.

At step 930, the node may optionally receive connection information from the second further node in response to the request sent at step 920. The connection information received at step 930 may include at least one network identifier identifying at least one of the IP networks to which the second further node is connected, and an IP address of the second further node associated with the at least one IP network.

At step 940, the node may optionally select at least one of the Internet Protocol networks to which the first further node is connected and also the second further node is connected. If the request received at step 910 includes the network identifiers identifying the IP networks to which the first further node is connected, the node may select at least one of the IP networks identified by the network identifiers received in the request of step 910. For example, the node may apply a rule configured in the node for selecting the IP network from the multiple IP networks to which the first further node is connected, e.g., a rule which aims at identifying an IP network to which both the first further node and the second further node are connected. For this purpose, the node may utilize network identifiers identifying the IP networks to which the first further node is connected, e.g., as received in the request of step 910 and identifiers identifying one or more IP networks to which the second further node is connected, e.g., as received in the step 930. In some scenarios, such rule could also be based on other criteria, e.g., a type of the IP based connection to be established between the first further node and the second further node and/or a protocol type used on the IP based connection to be established between the first further node and the second further node.

At step 950, the node sends connection information to the first further node. This is accomplished in response to the request received at step 910. The connection information sent at step 950 enables the first further node to establish the IP based connection to the second further node. The sent connection information includes at least one network identifier identifying at least one of the IP networks to which the first further node is connected, and to which also the second further node is connected, and an IP address of the second further node associated with the at least one IP network. The network identifier(s) may identify the IP network(s) selected at step 940.

The node may determine the sent connection information from the connection information received at step 930 from the second further node. For example, the sent connection information may correspond to the connection information received at step 930 from the second further node. Further, the sent connection information could correspond to a part of the connection information received at step 930 from the second further node.

If at optional step 940 the node selected at least one of the IP networks to which the first further node is connected and also the second further node is connected, the connection information sent at step 950 may include the at least one network identifier identifying the at least one selected IP network and the associated IP address of the second further node.

Figure 10:
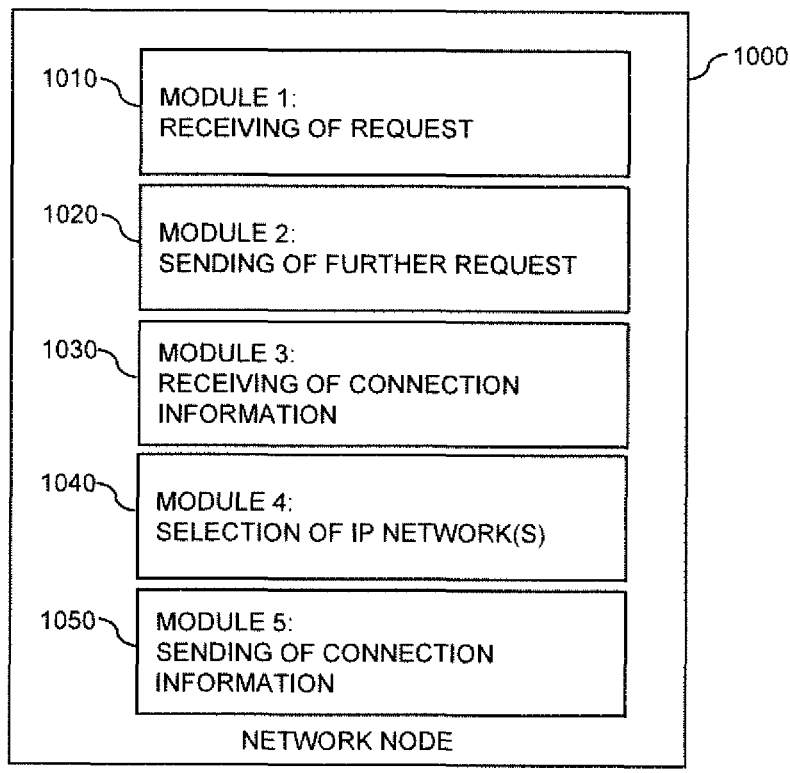
FIG. 10 shows a block diagram for illustrating functionalities of a network node according to an embodiment of the invention.

FIG. 10 shows a block diagram for illustrating functionalities of a network node 1000 which operates according to the method of FIG. 9. As illustrated, the network node 1000 may be provided with a module 1010 adapted to receive a request for connection information from a first further node having multiple IP addresses, each corresponding to one of multiple IP networks to which the first further node is connected, such as explained in connection with step 910. Further, the network node 1000 may optionally be provided with a module 1020 adapted to send a further request for connection information to a second further node, such as explained in connection with step 920. Further, the network node 1000 may optionally be provided with a module 1030 adapted to receive the connection information in response to the request to the second further node, such as explained in connection with step 930. Further, the network node 1000 may optionally be provided with a module 1040 adapted to select one of the IP networks, such as explained in connection with step 940. Further, the network node 1000 may be provided with a module 1050 adapted to send connection information in response to the request from the first further node, such as explained in connection with step 950.

It is noted that the network node 1000 may include further modules for implementing other functionalities, such as known functionalities of a CN node, such as an MME/S-GW, or of a centralized management node of a communication network. Further, it is noted that the modules of the network node 1000 do not necessarily represent a hardware structure of the network node 1000, but may also correspond to functional elements, e.g., implemented by hardware, software, or a combination thereof.

It is noted that the methods of FIGS. 5, 7 and 9 may also be combined in various ways, e.g., in a system including a node rating according to the method of FIG. 9, a first further node operating according to the method of FIG. 5, and a second further node to which the first further node needs to establish the IP based connection. In such system, the first further node has multiple IP addresses. Each of the multiple IP addresses is associated with a corresponding IP network to which the first further node is connected. Each of the these IP networks is identified by a corresponding network identifier. The first further node is adapted to send a request to the second further node, and in response to the request, receive connection information of the second further node. The received connection information includes at least one network identifier and an associated IP address of the second further node. Further, the first further node is adapted to select one of the IP networks based on the at least one network identifier, and via the selected Internet Protocol network and based on the associated IP address, establish an IP based connection to the second further node. The second further node is adapted to receive the request from the first further node and, in response to the request, send the connection information of the second further node to the first further node. Further, in such system the second further node could operate according to the method of FIG. 7. The second further node could thus be adapted to receive a further request from the further node and, in response to the further request, send connection information to the further node. The connection information sent to the further node could then include the at least one network identifier and the associated IP address of the second further node.

Figure 11:
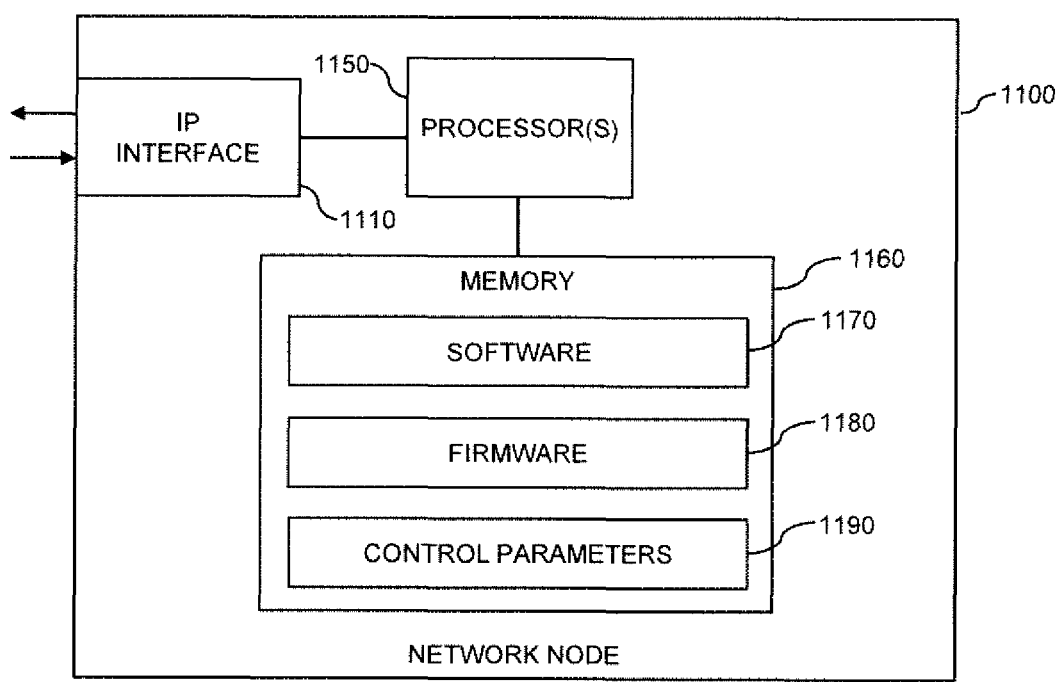
FIG. 11 schematically illustrates structures of a network node according to an embodiment of the invention.

FIG. 11 illustrates a processor-based implementation of a network node 1100 which may be used for implementing the above described concepts. For example, the structures as illustrated in FIG. 11 may be used for implementing the above-mentioned nodes of a communication network, e.g., one of the RAN nodes 120, 220, 230, 240, 250, 321, 322, 323, 600, 800, or one of the CN nodes 110, 210; 301, 302, 1000.

As illustrated, the network node 1100 may include an IP interface 1110 for communicating with other nodes of the communication network. The IP interface 1110 may in some cases support connectivity to multiple IP networks. In this case, the network node 1100 may have a corresponding IP address for each of the multiple IP networks.

Further, the network node 1100 may include one or more processors 1150 coupled to the IP interface 1110 and a memory 1160 coupled to the processor(s) 1150. By way of example, the IP interface 1110, the processor(s) 1150, and the memory 1160 could be coupled by one or more internal bus systems of the network node 1100. The memory 1160 may include a Read-Only-Memory (ROM), e.g. a flash ROM, a Random Access Memory (RAM), e.g. a Dynamic RAM (DRAM) or Static RAM (SRAM), a mass storage, e.g. a hard disk or solid state disk, or the like. As illustrated, the memory 1160 may include software 1170, firmware 1180, and/or control parameters 1190. The memory 1160 may include suitably configured program code to be executed by the processor(s) 1150 so as to implement the above-described functionalities of a network node, such as explained in connection with FIG. 5, 7, or 9.

It is to be understood that the structures as illustrated in FIG. 11 are merely schematic and that the network node 1100 may actually include further components which, for the sake of clarity, have not been illustrated, e.g., further interfaces or processors. Also, it is to be understood that the memory 1160 may include further program code for implementing known functionalities of a network node 1100, e.g., known functionalities of a RAN node, such as an eNB of the LTE technology or of an access node of a 5G radio access technology. According to some embodiments, also a computer program may be provided for implementing functionalities of the network node 1100, e.g., in the form of a physical medium storing the program code and/or other data to be stored in the memory 1160 or by making the program code available for download or by streaming.

As can be seen, the concepts as described above may be used for efficiently establishing an IP based connection between nodes of a communication network, even if at least one of the nodes is connected to multiple IP networks. Overprovisioning nodes with configuration information covering all theoretical possibilities of connection setup can be avoided. This is specifically beneficial in scenarios where a node can have a number of IP based connections to other nodes and the nodes to which these IP based connections are established may vary. In the claimed solution, the connection information can be obtained when it is needed for establishing the IP based connection and then be used for selecting an appropriate IP network for establishing the IP based connection and choosing the correct IP addresses.

It is to be understood that the examples and embodiments as explained above are merely illustrative and susceptible to various modifications. For example, the illustrated concepts may be applied in connection with various kinds of communication technologies, without limitation to the above-mentioned examples of wireless communication networks. Further, the illustrated concepts may be applied for establishing IP based connections between in various kinds of nodes, without limitation to RAN nodes. Further, it is noted that the connection information could also be supplemented with other information which could be useful for establishing the IP based connection. Moreover, it is to be understood that the above concepts may be implemented by using correspondingly designed software to be executed by one or more processors of an existing device, or by using dedicated device hardware. Further, it should be noted that the illustrated nodes or devices may each be implemented as a single device or as a system or cloud of multiple interacting devices.

The invention claimed is:

1. A method of controlling connection establishment in a communication network, the method comprising:
   configuring, by a node of the communication network, multiple Internet Protocol addresses of the node,
   wherein each Internet Protocol address of the multiple Internet Protocol addresses is associated with a corresponding Internet Protocol network of a plurality of Internet Protocol networks to which the node is connected, and
   wherein each Internet Protocol network of the plurality of Internet Protocol networks is identified by a corresponding network identifier;
   receiving, by the node in response to a request sent by the node, connection information of a further node of the communication network, the received connection information comprising multiple network identifiers corresponding to Internet Protocol networks to which the further node is connected, and for each of the multiple network identifiers, an associated Internet Protocol address of the further node, and the multiple network identifiers comprising an Internet Protocol address of the further node associated with an Internet Protocol network of the Internet Protocol networks;

selecting, by the node, based on at least one network identifier of the multiple network identifiers, the Internet Protocol network, wherein the node and the further node are connected to the selected Internet Protocol network; and establishing an Internet Protocol based connection, by the node, with the further node via the selected Internet Protocol network based on the Internet Protocol address of the further node.

2. The method according to claim 1, wherein the selected Internet Protocol network is identified by one of the multiple network identifiers received in the connection information.

3. The method according to claim 1, wherein:
the request comprises a plurality of network identifiers identifying the plurality of Internet Protocol networks to which the node is connected, and
the plurality of network identifiers comprises Virtual Local Area Network tags.

4. The method according to claim 1, wherein:
the node and the further node are nodes of a radio access network part of a mobile communication network, and
the node sends the request to a node of a core network part of the mobile communication network.

5. A non-transitory computer readable recording medium storing a computer program comprising a program code to be executed by at least one processor of the node of the communication network, wherein execution of the program code causes the node to perform the steps of the method according to claim 1.

6. A method of controlling connection establishment in a communication network, the method comprising:
receiving, by a first node of the communication network, a request from a second node of the communication network, the second node having multiple first Internet Protocol addresses,
wherein each Internet Protocol address of the multiple first Internet Protocol addresses is associated with a corresponding Internet Protocol network of a plurality of Internet Protocol networks to which the second node is connected, and
wherein each Internet Protocol network of the plurality of Internet Protocol networks is identified by a corresponding network identifier; and
sending, by the first node, in response to the request, first connection information of a third node to the second node,
wherein the first connection information comprises multiple network identifiers corresponding to Internet Protocol networks to which the third node is connected, and for each of the multiple network identifiers, an associated Internet Protocol address of the third node, and the multiple network identifiers comprising an Internet Protocol address of the third node associated with an Internet Protocol network of the Internet Protocol networks,
wherein the first connection information enables the second node to select, based on at least one network identifier of the multiple network identifiers, the Internet Protocol network, wherein the second node and the third node are connected to the selected Internet Protocol network, and
wherein the first connection information enables the second node to establish an Internet Protocol based connection with the third node via the selected Internet Protocol network, based on the Internet Protocol address of the third node.

7. The method according to claim 6, further comprising:
sending, by the first node, a further request to the third node;
receiving, by the first node, in response to the further request, second connection information from the third node; and
determining, by the first node, the first connection information from the second connection information.

8. The method according to claim 6, wherein the third node has multiple second Internet Protocol addresses, each of the multiple second Internet Protocol addresses being associated with the Internet Protocol networks to which the third node is connected and each of the Internet Protocol networks to which the third node is connected is identified by a corresponding network identifier of the multiple network identifiers.

9. The method according to claim 6, further comprising selecting, by the first node, the Internet Protocol network to which the second node and the third node are connected,
wherein the first connection information comprises the at least one network identifier identifying the Internet Protocol network and the Internet Protocol address of the third node.

10. The method according to claim 6, wherein:
the request comprises a plurality of network identifiers identifying the plurality of Internet Protocol networks to which the second node is connected, and
the first node selects at least one of the plurality of Internet Protocol networks identified by the plurality of network identifiers received in the request.

11. A node for a communication network, the node being adapted to:
configure multiple Internet Protocol addresses of the node,
wherein each Internet Protocol address of the multiple Internet Protocol addresses is associated with a corresponding Internet Protocol network of a plurality of Internet Protocol networks to which the node is connected, and
wherein each Internet Protocol network of the plurality of Internet Protocol networks is identified by a corresponding network identifier;
receive, in response to a request sent by the node, connection information of a further node of the communication network, the received connection information comprising multiple network identifiers corresponding to Internet Protocol networks to which the further node is connected, and for each of the multiple network identifiers, an associated Internet Protocol address of the further node, and the multiple network identifiers comprising an Internet Protocol address of the further node associated with an Internet Protocol network of the Internet Protocol networks;
select, based on at least one network identifier of the multiple network identifiers, the Internet Protocol network, wherein the node and the further node are connected to the selected Internet Protocol network; and establish an Internet Protocol based connection with the further node via the selected Internet Protocol network based on the Internet Protocol address of the further node.

12. The node according to claim 11, wherein
the selected Internet Protocol network is identified by one of the multiple network identifiers received in the connection information.

13. The node according to claim 11, wherein:
the node and the further node are nodes of a radio access network part of a mobile communication network,
the node is configured to send the request to a node of a core network part of the mobile communication network, and
the node of the core network part of the mobile communication network comprises a Mobility Management Entity and/or a Serving Gateway.

14. A first node for a communication network, the first node being adapted to:
receive a request from a second node of the communication network, the second node having multiple first Internet Protocol addresses,
wherein each Internet Protocol address of the multiple first Internet Protocol addresses is associated with a corresponding Internet Protocol network of a plurality of Internet Protocol networks to which the second node is connected, and
wherein each Internet Protocol network of the plurality of Internet Protocol networks is identified by a corresponding network identifier;
send, in response to the request, first connection information of a third node to the second node,
wherein the first connection information comprises multiple network identifiers corresponding to Internet Protocol networks to which the third node is connected, and for each of the multiple network identifiers, an associated Internet Protocol address of the third node, and the multiple network identifiers comprising an Internet Protocol address of the third node associated with an Internet Protocol network of the Internet Protocol networks,
wherein the first connection information enables the second node to select, based on at least one network identifier of the multiple network identifiers, the Internet Protocol network, wherein the second and the third node are connected to the selected Internet Protocol network, and
wherein the first connection information enables the second node to establish an Internet Protocol based connection with the third node via the selected Internet Protocol network, based on the Internet Protocol address of the third node.

15. The first node according to claim 14, wherein the first node is adapted to:
send a further request to the third node;
receive, in response to the further request, second connection information from the third node; and
determine the first connection information from the second connection information.

16. The first node according to claim 14, wherein the third node has multiple second Internet Protocol addresses, each of the multiple second Internet Protocol addresses being associated with the Internet Protocol networks to which the third node is connected, and each of the Internet Protocol networks to which the third node is connected is identified by a corresponding network identifier of the multiple network identifiers.

17. The first node according to claim 14, wherein:
the first node is adapted to select the Internet Protocol network to which the second node and the third node are connected, and
the first connection information further comprises the at least one network identifier identifying the Internet Protocol network and the Internet Protocol address of the third node.

18. The first node according to claim 14, wherein:
the request comprises a plurality of network identifiers identifying the plurality of Internet Protocol networks to which the second node is connected, and
the first node selects at least one of the plurality of Internet Protocol networks identified by the plurality of network identifiers received in the request.

* * * * *